Oct. 18, 1938.  L. J. SMALLEN  2,133,582
BROILER
Filed Aug. 3, 1936  3 Sheets-Sheet 1
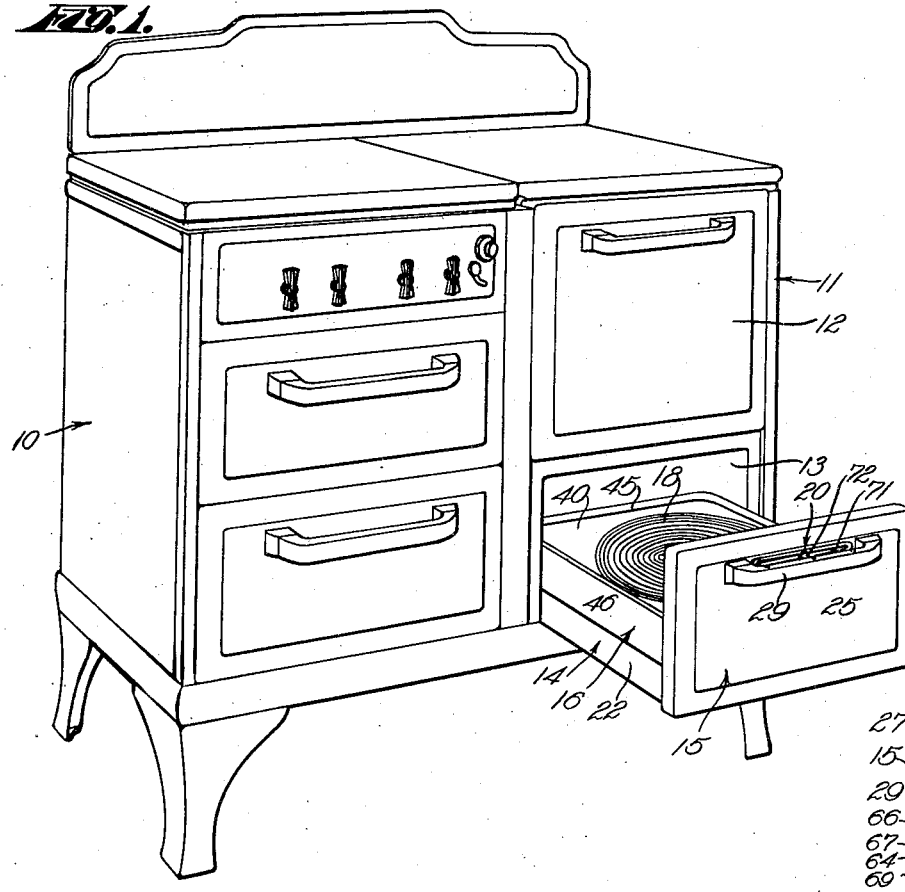
Inventor
LOUIS J. SMALLEN
By
His Attorney Oct. 18, 1938.　　　L. J. SMALLEN　　　2,133,582
BROILER
Filed Aug. 3, 1936　　　3 Sheets-Sheet 2
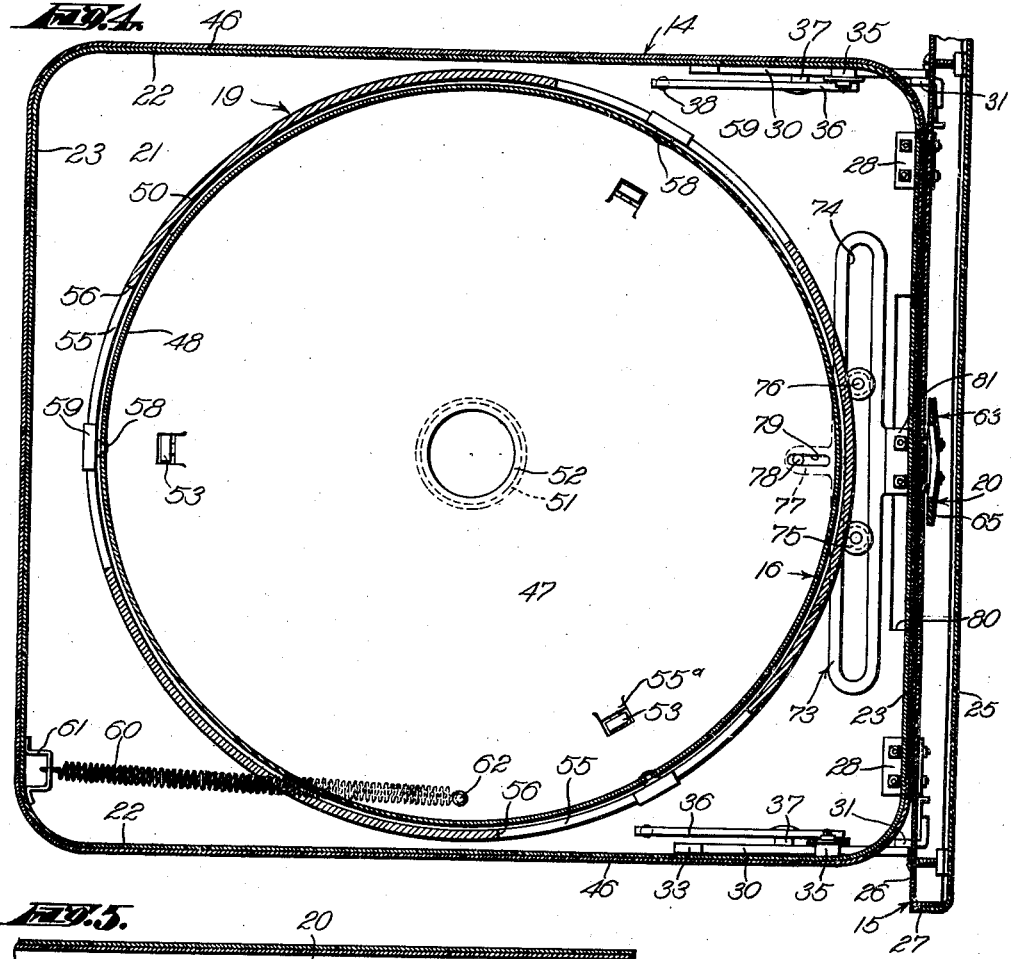
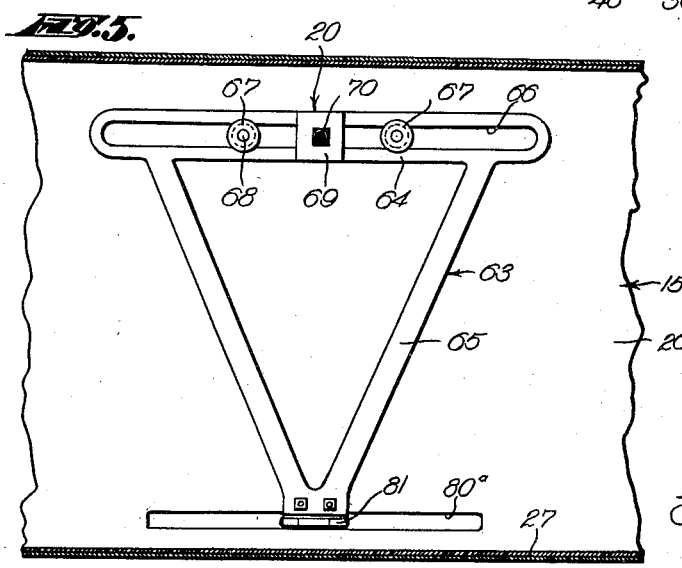
Inventor
LOUIS J. SMALLEN
By
His Attorney

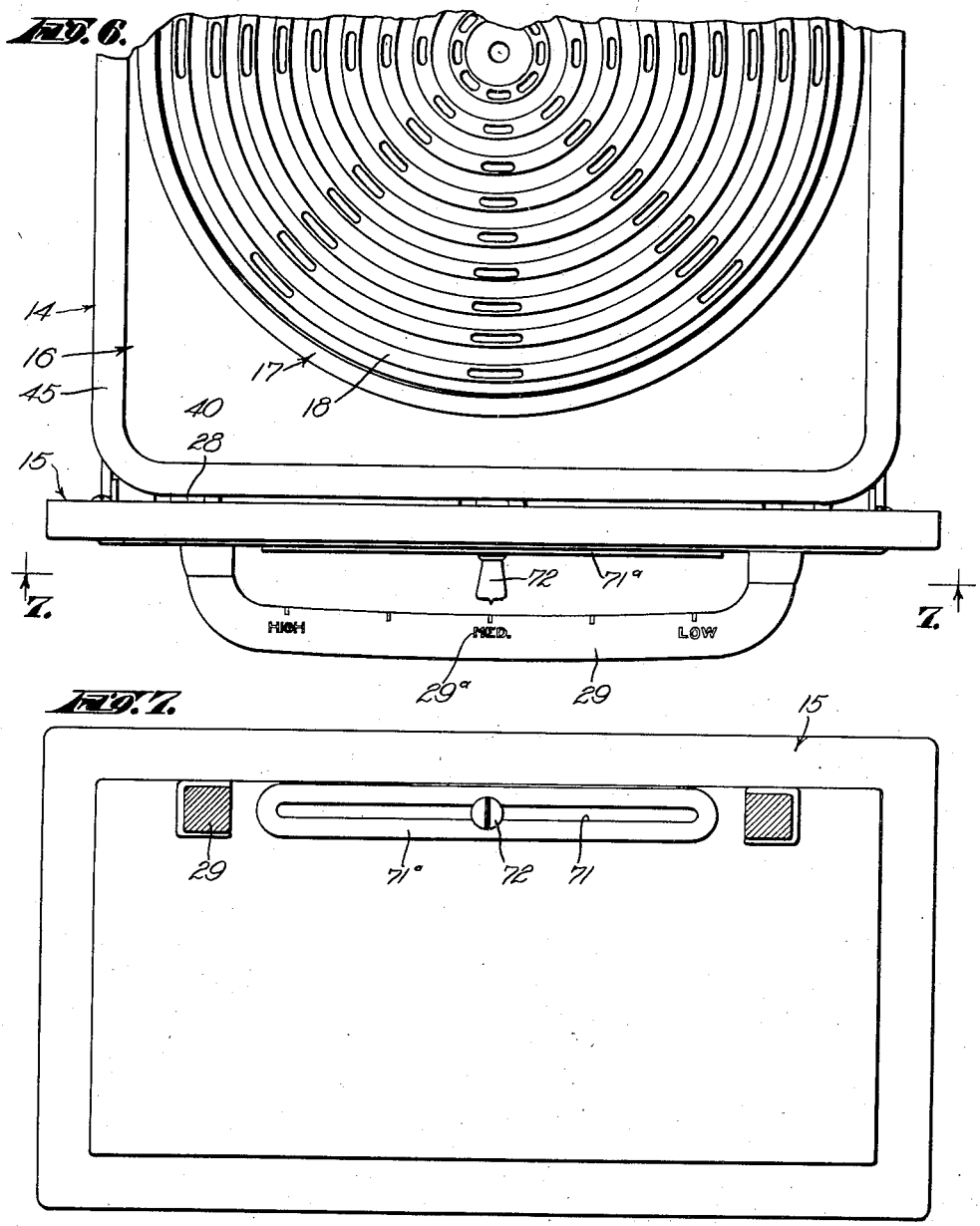

Patented Oct. 18, 1938

2,133,582

UNITED STATES PATENT OFFICE 2,133,582

BROILER

Louis J. Smallen, Los Angeles, Calif.

Application August 3, 1936, Serial No. 93,974

4 Claims. (Cl. 126—41)

This invention relates to cooking devices and relates more particularly to broilers for cooking ranges and stoves. A general object of this invention is to provide a simple, practical broiler in which the carrier for the grill and pan may be very easily and conveniently adjusted or regulated with relation to the burner or source of heat.

Another object of this invention is to provide a broiler in which the operating member or handle for effecting adjustment or movement of the carrier is conveniently accessible for manipulation and is located where it does not become heated.

Another object of this invention is to provide a broiler that may be incorporated in the drawer of a range or the like and may be embodied in the stove or range without altering, modifying or in any way changing any parts of the range proper.

Another object of this invention is to provide a broiler of the character mentioned in which the operative member or handle for elevating and lowering the carrier of the grill and pan is located at the outer face of the hinged door of the drawer to move with the door and yet be capable of independent manipulation.

Another object of this invention is to provide an improved broiler of the character mentioned in which the carrier for the broiling pan and grill moves smoothly and evenly and remains in any desired setting or adjustment.

Another object of this invention is to provide a broiler of the character mentioned in which the elevating mechanism for shifting the pan carrier is positioned to be subject to a minimum of heat and is not exposed to grease or liquids that may fall from the food being broiled.

Another object of this invention is to provide a broiler of the character mentioned in which the elevating mechanism is disposed below the carrier of the pan as distinguished from certain prior devices wherein the elevating mechanisms are arranged at the sides of the carriers.

Another object of this invention is to provide a broiler of the character mentioned in which the elevating mechanism occupies a minimum of space permitting a greater range of vertical movement of the carrier and leaving a larger space for the food to be broiled.

A further object of this invention is to provide an adjustable or regulable broiler of the character mentioned in which the elevating means and the actuating means therefor are characterized by their extreme simplicity and low cost.

The various objects and features of my invention will be fully understood from the following detailed description of a typical preferred form and application of the invention, throughout which description reference is made to the accompanying drawings, in which:

Fig. 1 is a perspective front elevation of a typical range embodying the broiler of the present invention, illustrating the broiler drawer in the open position. Fig. 2 is an enlarged vertical detailed sectional view of the broiler removed from the range. Fig. 3 is an enlarged fragmentary vertical detailed sectional view of the operative connection between the operating means and the elevating cam. Fig. 4 is a horizontal detailed sectional view taken as indicated by line 4—4 on Fig. 2. Fig. 5 is a fragmentary vertical detailed sectional view taken as indicated by line 5—5 on Fig. 2. Fig. 6 is a fragmentary plan elevation of the broiler and Fig. 7 is a vertical detailed sectional view taken as indicated by line 7—7 on Fig. 6.

The broiler construction of the present invention is adapted to be applied to or embodied in stoves, ranges and the like of various types. In the following detailed description a simple, preferred form of the invention will be described as embodied in a more or less typical range, it being understood that the invention is not to be construed as limited or restricted to the specific form or application about to be described.

The cooking range illustrated in the drawings comprises the range body 10 which carries the various burners, etc., and which provides the various compartments and drawer spaces. The particular range illustrated is provided with an oven 11 located at one side or end. The oven 11 is normally closed by a suitable hinged door 12. The lower portion of the oven 11 constitutes the broiler compartment 13 of the range. The burner or heating element (not shown) is arranged in the oven 11 to cook food in the oven as well as in the broiler to be subsequently described. It is to be understood that the range may employ any suitable form of heat generating means and may be of any desired construction.

The broiler of the present invention includes, generally, a shiftable drawer 14 in the broiler compartment 13, a door 15 on the drawer 14, a vertically movable carrier 16 on the drawer 14 for carrying a pan 17 and a grill 18, means 19 for shifting the carrier 16 vertically and means 20 for controlling or actuating the means 19.

The broiler drawer 14 may be varied in construction to suit the particular use or application of the broiler. In the particular case illustrated in the drawings the drawer 14 is formed of sheet metal, or the like, and is substantially rectangular in plan elevation. The drawer 14 includes a bottom 21, sides 22 and ends 23. The bottom 21 of the drawer is preferably flat and substantially horizontal while the drawer sides 22 and ends 23 are preferably flat and vertical. The corners of the drawer 14 where its sides 22 and ends 23 join may be rounded, as best illustrated in Fig. 4 of the drawings. The drawer 14 is proportioned to fit the compartment 13 and is shiftable between a position entirely within the compartment 13 and a position where its major portion projects from the front of the range. In practice the drawer 14 may be supported for this movement on rollers or other suitable means. The upper end or edge of the drawer 14 is spaced a considerable distance below the upper end of the compartment 13 leaving a relatively large cooking space. It is to be noted that the drawer 14 just described may be of very simple construction.

The door 15 is provided at the outer or forward end 23 of the drawer 14 and is operable to close the forward end of the compartment 13 when the drawer is in its innermost position. The door 15 is normally vertical. However, it is hingedly connected with the drawer 14 to be moved between a vertical position and a substantially horizontal position projecting forwardly from the drawer. The door 15 preferably comprises a front 25 and a back 26 spaced inwardly or rearwardly from the front 25. The door front 25 and back 26 may have overlapping flange parts 27 at their edges to close the space within the hollow door. The door front and back may be assembled and connected in any suitable manner and the door 15 may be suitably insulated, if desired. In the embodiment of the invention illustrated the door 15 is generally rectangular in shape and is proportioned to fully close the end of the broiler compartment 13. It is to be understood that the door 15 may be finished to correspond with the front panels and doors of the range. Spaced hinges 28 hingedly connect the lower edge portion of the door back 26 with the drawer 14. The hinges 28 are preferably located adjacent the opposite ends of the door 15 and each have a cheek secured to the door back 26 and a cheek secured to the bottom 21 of the drawer. A suitable handle 29 is provided on the door 15 to facilitate shifting of the broiler drawer 14 and opening and closing of the door. As illustrated in the drawings, the handle 29 may be an elongate horizontally disposed member secured to the front 25 of the door 15 adjacent the upper edge of the door.

Latch controls and supports are preferably provided to yieldingly retain the door 15 in its up or closed position and to support the door 15 in its down or horizontal position. In practice a latch and support means may be provided at each side of the drawer 14 to govern movement of the door 15. Each door control includes a latch 30 arranged at the inner side of a drawer side 22 in spaced parallel relation therewith. The forward ends of the latches 30 are pivotally connected with the door 15. In the typical construction illustrated brackets 31 are secured to the door back 26 and the latches 30 are pivotally carried by the brackets 31. The latches 30 pass through openings 32 in the forward corner portions of the drawer 14. The latches 30 are longitudinally curved having a compound curvature and terminate at their rear ends with upwardly projecting forwardly facing hooks 33. Notches 34 are provided in the lower edges of the latches 30 intermediate their ends. Flanged rollers 35 are rotatably supported by suitable inwardly projecting pins on the drawer sides 22 and cooperate with the upper edges of the latches 30 and the outer sides of the latches. The hooks 33 are adapted to cooperate with the rollers 35 when the door 15 is hinged downwardly and forwardly and the cooperation of the hooks 33 with the rollers 35 limits the movement of the door 15 and supports the door in its substantially horizontal position.

Latch levers 36 are pivotally supported between their ends by pins 37 projecting from the sides 22 of the broiler drawer. Springs 38 are connected with the rear arms of the latch levers 37 to pivot the forward arms of the levers upwardly. The springs 38 may be connected with the bottom 21 of the drawer 14. The forward arms of the levers 36 are curved upwardly and carry rotatable flanged rollers 39. The rollers 39 cooperate with the lower edges of the latches 30 and have their flanges engaging the sides of the latches. When the door 15 is in its closed position the rollers 39 cooperate with the notches 34 to yieldingly or releasably retain the door 15 in its vertical closed position. When the door 15 is moved downwardly and forwardly the cooperation of the notches 34 with the rollers 39 swings the forward arms of the levers 36 downwardly against the action of the springs 38. The rollers 39 remain in cooperation with the latches 30 during the entire range of movement of the door 15. The door controls just described serve to dependably support the door 15 when in its open horizontal positions and to yieldingly latch the door in its vertical closed positions.

The carrier 16 is provided to support the broiling pan 17, the grill 18 and any other cooking vessels that may be employed in the broiler. The carrier 16 is shiftable by the means 19 whereby the position of the food relative to the burner or heating element may be varied and controlled at will. In accordance with the invention the carrier 16 may be an integral member of sheet metal or the like. The carrier 16 includes a substantially horizontal top 40 corresponding generally in configuration to the plan configuration of the drawer 14. The top 40 has a central vertical opening 41 of substantial diameter for receiving the pan 17. The pan 17 may have a peripheral lip 42 seating downwardly within a vertical flange 43 of the top 40. The pan 17 operates to close the opening 41 of the carrier 16. The grill 18 when employed extends across the mouth or upper side of the pan 17. The particular grill 18 illustrated has annular corrugations and is slotted. An annular downwardly projecting lip or rim 44 may be provided on the grill 18 to fit within the lip 42 and seat downwardly on the edge portion of the pan 17. A continuous upturned rim or ridge 45 may be provided at the outer edge of the top 40. In accordance with the invention the carrier 16 has downwardly projecting side and end flanges 46 in shiftable telescopic relation to the sides 22 and ends 23 of the drawer 14. In the preferred construction illustrated the flanges 46 extend downwardly at the outer sides of the drawer sides 22 and ends 23. The flanges 46 remain in cooperation with the drawer sides and ends throughout the full range of movement of the carrier 16. The cooperation of the flanges 46 with the drawer sides 22 and ends 23 prevents rotation of the carrier 16 and maintains the carrier in its proper position on the drawer. It is to be noted that the carrier 16 when provided with the pan 17 closes the upper end of the broiler drawer 14 and leaves the interior of the drawer unoccupied.

The means 19 for elevating or shifting the carrier 16 is in the nature of an extremely simple cam means. The elevating or shifting means 19 includes two parts, one a rotatable or turnable part and the other a part on the carrier 16. In the embodiment of the invention illustrated the turnable part of the means 19 is in the form of a rotor or cam 47 and the part on the carrier 16 is in the nature of a cam track or ring 48. The ring 48 is of substantial length or height and may be in the form of a tube. The upper end portion of the ring 48 is secured to the top 40 as by welding, or the like. The cam ring 48 is concentric with the central opening 41 in the carrier top 40. The cam 47 is in the nature of a substantially horizontal drum or turntable provided at its periphery with an upwardly projecting annular flange 50. The cam 47 is supported for turning movement about an axis concentric with the axis of the ring 48. In the simple construction illustrated an opening is provided in the bottom 21 of the drawer 14 and a rim 51 is turned upwardly about the opening. A tubular boss or hub 52 projects downwardly from the center of the cam 47 and rotatably operates in the rim 51 to centralize and steady the cam 47. Rollers 53 preferably support the cam 47 for free turning movement. The rollers 53 may be rotatably supported by pins 54 passing through downwardly turned integral lugs 55ª of the cam 47. The rollers 53 are circumferentially spaced and operate on the upper side of the drawer bottom 21 to support the cam 47 for movement about its axis.

The means 19 includes inclined faces or cam faces 55 on the cam flange 50 for effecting vertical movement of the carrier 16. In the preferred construction the cam faces 55 occur on the upper edge of the cam flange 50. The flange 50 is interrupted at circumferentially spaced points by notches which provide the edge of the flange with the inclined cam faces 55 and substantially vertical shoulders 56. The pitch or inclination of the cam faces 55 is preferably relatively gradual. The cam faces 55 and the shoulders 56 join at rounded edges 57. Parts are provided on the ring 48 for cooperating with the cam faces 55 and the shoulders 56. In the preferred form of the invention pins 58 project outwardly from the ring 48 and rotatably carry rollers 59 which cooperate with the cam faces 55. There is preferably one roller 59 for cooperating with each cam face 55. The rollers 59 cooperating with the cam faces 55 support the carrier 16 on the cam 47 and when the cam is turned the cam faces 55 effect vertical shifting of the carrier 16. The concave edge portions 57 of the cam faces are adapted to receive the rollers 59 when the carrier 16 is moved to its lowermost position to lessen the shock of the engagement of the rollers with the shoulders 56.

Means may be provided to counterbalance or partially overcome the weight of the carrier 16 and the parts carried thereby to facilitate the easy shifting of the carrier. A coiled extensible spring 60 has one end connected to a bracket 61 on the drawer 14 and its other end secured to a pin 62 on the cam 47. The spring 60 exerts a turning force on the cam 47 in a direction to assist in overcoming the weight of the carrier 16 and the parts carried thereby.

The means 20 is operable to turn the cam 47 to effect vertical shifting of the carrier 16 to any desired position within its range of movement. It is a feature of the invention that the means 20 is operable at the front of the door 15 whereby the carrier 16 may be regulated vertically without engaging any parts within the broiler compartment 13 and, therefore, without opening the drawer 14 or the door 15. The operating means 20 includes a shiftable member 63 within the hollow door 15. The member 63 may be substantially triangular comprising an upper part 64 and two downwardly convergent arms 65 extending from the part 64 and joining one another at their lower ends. The member 63 is supported or mounted for movement in the door 15. The part 64 is provided with a longitudinal slot 66 and rollers 67 cooperate with the slot 66 to shiftably support the member 63 for horizontal movement. In practice there may be two spaced rollers 67 rotatably supported by pins 68 projecting forwardly from the back 26 of the door 15. The rollers 67 are preferably flanged to cooperate with a side surface of the part 64. Means is provided for manually shifting the member 63. A bracket 69 is welded or otherwise secured to the part 64 intermediate its ends and a stem 70 projects forwardly from the bracket 69. The stem 70 projects forwardly through a horizontal slot 71 in the front 25 of the door 15. A handle or knob 72 is provided on the projecting outer end of the stem 71. In the construction illustrated the handle 29 on the drawer door 15 is in the nature of an elongate horizontal bar whose opposite ends turn inwardly and are secured to the door 15. The slot 71 is preferably located to be spaced directly at the rear of the handle 29 and the knob 72 is at the rear of the handle 29. The knob 72 may be readily engaged and without interfering with the handle. It will be noted that the handle 29 substantially conceals the slot 71 and the knob 72 so that they do not detract from the appearance of the drawer door 15. A slotted plate 71ª may be provided on the front of the door 15 at the slot 71. The handle 29 may be calibrated and may bear legends 29ª which may be read together with the knob 72 to determine the position or adjustment of the carrier 16. The parts are preferably related so that the knob 72 is substantially midway between the ends of the handle 29 when the carrier 16 is in the intermediate position.

The operating means 20 further includes a shiftable member 73 within the drawer 14. The member 73 is an elongate part shiftably supported on the bottom 21 of the drawer. The member 73 preferably extends parallel with the forward end 23 of the drawer and is provided with a longitudinal slot 74. Flanged rollers 75 cooperate with the slot 74 and a side surface of the member 73 to support and guide the member for horizontal movement in parallelism with the forward drawer end 23. The rollers 75 may be rotatably carried by pins 76 projecting upwardly from the drawer bottom 21. The member 73 is provided with a rearwardly projecting tongue or lug 77. An upstanding pin 78 is fixed to the lug 77 and cooperates with a radial slot 79 in the turnable cam 47. When the member 73 is shifted longitudinally the cooperation of the pin 78 with the slot 79 effects turning of the cam 47 about its axis and, therefore, effects vertical shifting of the carrier 16.

The invention provides a novel operative connection between the member 63 in the door 15 and the shiftable member 73 in the drawer 14. It is a feature of the invention that this operative connection is such that the door 15 may be hinged between its closed and open positions and the carrier 16 may be shifted or adjusted with the door in any position. A horizontal slot 80 is provided in the forward end 23 of the drawer 14. The slot 80 may occur where the end 23 joins the drawer bottom 21. The connection between the operating members 63 and 73 comprises a hinge 81 similar to the hinges 28. The member 73 is provided with a forwardly projecting tongue 82 and one cheek of the hinge 81 is secured to the tongue 82 by screws or other suitable means. The other cheek of the hinge 81 is secured to the lower portion of the member 63. The hinge 81 freely passes through a slot 80ª in the back 26 and the slot 80 without interference and the hinge has its pivotal axis positioned so that the door 15 may be freely hinged or pivoted between its open and closed positions. The hinge 81 does not serve to support the door 15 and merely forms an operative connection between the members 63 and 73. The hinge 81 permits the member 63 to pivot or hinge relative to the member 73 when the door 15 is swung between its open and closed positions and is capable of at all times transmitting movement between the member 63 and the member 73 to effect adjustment or turning of the cam 47. The rollers 67 may cooperate with the ends of the slot 66 and the rollers 75 may cooperate with the ends of the slot 74 to limit horizontal shifting of the members 63 and 73 and, therefore, limit the extent of adjustment or movement of the carrier 16. It is believed that it will be apparent how movement of the member 63 by means of the knob 72 is transmitted to the member 73 through the hinge 81 to effect turning of the cam 47 and vertical shifting of the carrier 16.

In use or operation of the broiler provided by this invention the knob 72 may be easily engaged and shifted horizontally to adjust or move the carrier 16 vertically. The knob 72 being located at the front of the door 15 is conveniently accessible and may be engaged and operated without danger of being burned. The knob 72 being disposed at the forward side of the door 15 does not become heated to any appreciable degree and, therefore, may be engaged and manipulated without danger. The slot 71 and the knob 72 being positioned behind the handle 29 are substantially concealed and do not detract from the appearance of the broiler drawer door. When the knob 72 is shifted horizontally the member 63 likewise shifts horizontally and the hinge 81 transmits the movement from the member 63 to the member 73. It will be observed that the hinge 81 is operable to transmit this movement with the door 15 in any position. Upon horizontal movement of the member 73 the pin 78 cooperates with the slot 79 to effect turning of the cam 47. When the cam 47 is turned the cam faces 55 and the rollers 59 cooperate to effect vertical shifting of the carrier 16. The direction of vertical movement of the carrier 16 of course depends upon the direction of movement of the members 63 and 73. When the cam 47 is turned in one direction the rollers 59 roll down on the cam faces 55 under the weight of the carrier 16 and the parts supported thereon so that the carrier 16 is lowered. When the cam 47 is turned in the other direction the cam faces 55 cooperate with the rollers 59 to move the carrier 16 upwardly. As described above, the flanges 46 of the carrier 16 cooperate with the sides 22 and ends 23 of the drawer 14 to prevent turning of the carrier and to guide the carrier for vertical movement. The rollers 59 cooperate with the cam faces 55 to effect smooth regular movement of the carrier 16. The spring 60 assists in the elevating or operating of the carrier 16 serving to counterbalance or partially counteract the weight of the carrier 16 of the parts carried thereby.

The various parts of the elevating means 19 and the operating means 20 are entirely protected against grease and food particles that may fall from the food being broiled so that their operation is not interfered with by accumulations of such matter. Further, it will be observed that the elevating means 19 and the operating means 20 are positioned below the broiler carrier 16 and within the door 15 so that they are not subjected to excessive temperatures. The broiler of the present invention may be entirely embodied in a simple broiler drawer without any modification or alteration of the range proper. The means 19 for elevating the carrier 16 and the operating means 20 are entirely carried by the drawer 14 and its door 15 and there are no parts projecting into or through the walls of the range. The elevating means 19 is compact and is entirely disposed within the drawer 14 and below the carrier 16 leaving an ample cooking space in the compartment 13. The operating means 20 is housed in the door 15 of the drawer 14 and does not occupy any useful space in the cooking compartment. The elevating means 20 is particularly simple involving the simple cam 47 and the rollers 59. The broiler may be constructed for use in various types and styles of ranges and stoves and is simple and easy to manufacture.

Having described only a typical preferred form and application of my invention, I do not wish to be limited or restricted to the specific details herein set forth, but wish to reserve to myself any variations or modifications that may appear to those skilled in the art or fall within the scope of the following claims:

Having described my invention, I claim:

1. In a stove having an oven compartment, a drawer carried in the compartment and having a plurality of upwardly projecting side walls, a drum mounted in the drawer for rotation about a vertical axis, the drum having an upwardly projecting peripheral flange, a series of like circumferentially spaced cam surfaces on the flange, a carrier arranged over the drawer and having a depending marginal flange overlying the side walls of the drawer and cooperating therewith to guide the carrier for vertical movement only, the carrier having a depending flange concentric with the drum and having parts cooperatively engaging the cam surfaces whereby the carrier is moved vertically when the drum is rotated, and means for rotating the drum.

2. In a stove having an oven compartment, a drawer carried in the compartment and having upwardly projecting walls angularly disposed relative to each other, a carrier arranged over the drawer and having depending flanges slidably engaging the walls of the drawer whereby the carrier is guided by the drawer for vertical movement only, and a turntable in the drawer between the carrier and the drawer operable to move the carrier vertically.

3. In a stove having an oven compartment, a drawer carried in the compartment, a drum mounted in the drawer for rotation about a vertical axis, the drum having an upwardly projecting peripheral flange, the upper edge of which is shaped to form a plurality of like circumferentially spaced cams, a carrier arranged over the drawer and having a depending marginal flange cooperating with the drawer whereby the carrier is guided by the drawer for vertical movement only, and having inner depending portions cooperatively engaging the cams, and means for rotating the drum so that the cams cooperate with said depending portions to cause vertical movement of the carrier.

4. In a stove having an oven compartment, a drawer in the compartment, a drum mounted in the drawer for rotation about a vertical axis, a plurality of cam surfaces circumferentially spaced around the periphery of the drum, a carrier having a depending part slidably engaging the drawer to be guided thereby for vertical movement only and having direct cooperative engagement with the cam surfaces, and means for rotating the drum so that the cam surfaces and carrier cooperate to effect vertical movement of the carrier.

LOUIS J. SMALLEN.